United States Patent [19]
Hosoya et al.

[11] Patent Number: 5,992,373
[45] Date of Patent: Nov. 30, 1999

[54] APPARATUS AND METHOD FOR CONTROLLING FUEL INJECTION OF DIRECT INJECTION GASOLINE INTERNAL COMBUSTION ENGINE

[75] Inventors: Hajime Hosoya; Naoki Tomisawa, both of Atsugi, Japan

[73] Assignee: Unisia Jecs Corporation, Atsugi, Japan

[21] Appl. No.: 08/956,466

[22] Filed: Oct. 23, 1997

[30] Foreign Application Priority Data

Oct. 31, 1996 [JP] Japan .................................. 8-290323

[51] Int. Cl.$^6$ ........................................ F02D 41/06
[52] U.S. Cl. ........................ 123/305; 123/179.17
[58] Field of Search ............................ 123/305, 357, 123/359, 456, 457, 436, 497, 179.17, 494

[56] References Cited

U.S. PATENT DOCUMENTS

| | | | |
|---|---|---|---|
| 4,638,782 | 1/1987 | Yashuhara et al. | 123/357 |
| 5,598,817 | 2/1997 | Igarashi et al. | 123/179.17 |
| 5,794,586 | 8/1998 | Oda et al. | 123/179.17 |
| 5,806,497 | 9/1998 | Hosoya | 123/494 |
| 5,848,583 | 12/1998 | Smith et al. | 123/497 |

FOREIGN PATENT DOCUMENTS

7-77119  3/1995  Japan .

*Primary Examiner*—Willis R. Wolfe
*Assistant Examiner*—Hieu T. Vo
*Attorney, Agent, or Firm*—Foley & Lardner

[57] ABSTRACT

Discrimination is effected as to which of low-pressure and high-pressure conditions the pressure of fuel to be fed to a fuel injection valve is in. If in the low-pressure condition, the fuel injection pulse widths are corrected by assuming that the fuel pressure is a predetermined reference pressure, since the detection errors of a fuel pressure sensor are large. If in the high-pressure condition, the fuel injection pulse widths are corrected based on an actual fuel pressure detected by the fuel pressure sensor.

13 Claims, 7 Drawing Sheets

APPARATUS AND METHOD FOR CONTROLLING FUEL INJECTION OF DIRECT INJECTION GASOLINE INTERNAL COMBUSTION ENGINE

BACKGROUND OF THE INVENTION

1. Field of the Invention

This invention relates to apparatus and method for controlling fuel injection of a direct injection gasoline internal combustion engine, and particularly to a correction control for injection pulse widths during an increasing change of fuel pressure just after starting of the engine.

2. Related Art of the Invention

There has been known a direct injection internal combustion engine in which a fuel is directly injected into a combustion chamber.

In such a direct injection internal combustion engine, the fuel feeding system comprises an engine-driven high-pressure fuel pump for feeding fuel to a fuel injection valve, an electric low-pressure fuel pump for feeding fuel to the high-pressure fuel pump, a low-pressure pressure regulator for regulating a pressure within a low pressure fuel system between the low-pressure fuel pump and high-pressure fuel pump to a predetermined low pressure, and a high-pressure pressure regulator for regulating a pressure within a high pressure fuel system on a downstream side of the high-pressure fuel pump to a predetermined high pressure (such as disclosed in Japanese Unexamined Patent Publication No. 7-77119).

If a pressure of fuel to be fed to the fuel injection valve (hereinafter called "fuel pressure") deviates from a desired pressure, the quantity of fuel to be actually injected into the fuel injection valve changes with respect to pulse widths of an injection pulse signal supplied to the fuel injection valve (hereinafter called "fuel injection pulse width"), resulting in deterioration of precision in air fuel ratio control. Thus, it is required to provide a sensor for detecting the fuel pressure to thereby correct the fuel injection pulse widths in response to a fuel pressure detected by such a fuel pressure sensor.

Unfortunately, as general characteristics of sensors for detecting fuel pressure, the error ratios become larger as the fuel pressure decreases. As a result, the errors in correcting the fuel injection pulse widths become larger during a low pressure state just after starting. Thus, the precision in air-fuel ratio control may be rather deteriorated, if the fuel injection pulse widths are corrected based on the detected result of the fuel pressure under such a condition.

SUMMARY OF THE INVENTION

The present invention has been carried out in view of the aforementioned problems. It is therefore an object of the present invention to assuredly restrain the errors in correcting the fuel injection pulse widths during a low pressure state just after starting, in a correction control for injection pulse widths in response to a fuel pressure.

In order to achieve the above object, the present invention provides apparatus and method for controlling fuel injection of a direct injection internal combustion engine, in which an open control, for correcting the fuel injection pulse widths by assuming that the pressure of fuel to be fed to the fuel injection valve equals to a predetermined reference pressure, and a closed control, for correcting the fuel injection pulse widths based on the actually detected fuel pressure, are switched to each other based on a discrimination result as to which of the low-pressure condition and the high-pressure condition the pressure of fuel to be fed to the fuel injection valve is in.

According to such a constitution, in the low-pressure condition just after engine starting, the fuel injection pulse widths are corrected by assuming that the fuel pressure equals to the predetermined reference pressure without adopting the detection result of the fuel pressure, while in the high-pressure condition, the fuel injection pulse widths are corrected based on the actually detected fuel pressure. Thus, in the low-pressure condition in which the detection errors of fuel pressure are large, the correction is effected by assuming that the fuel pressure is constant irrespectively of the actually detected fuel pressure value, so that the correction errors of pulse widths in the low-pressure condition can be restricted to a predictably relatively small level.

The fuel injection pulse widths are preferably corrected by adopting the predetermined reference pressure in the open control as a regulating pressure of the low-pressure pressure regulator, in case that the present apparatus comprises an engine-driven high-pressure fuel pump for feeding fuel to the fuel injection valve, an electric low-pressure fuel pump for feeding fuel to the high-pressure fuel pump, a low-pressure pressure regulator for regulating a pressure within a low pressure fuel system between the low-pressure fuel pump and high-pressure fuel pump to a predetermined low pressure, and a high-pressure pressure regulator for regulating a pressure within a high pressure fuel system on a downstream side of the high-pressure fuel pump to a predetermined high pressure.

According to such a constitution, when the fuel pressure is discriminated to be in the low-pressure condition, the fuel injection pulse widths are corrected by assuming that the actual fuel pressure is regulated to the regulating pressure by the low-pressure pressure regulator.

Further, it is possible to discriminate as to which of the low-pressure condition and high-pressure condition the pressure of fuel to be fed to the fuel injection valve is in, by comparing the actually detected fuel pressure with a previously set switching pressure.

In such a constitution, the fuel pressure is discriminated to be in either of the low-pressure or high-pressure condition, based on the larger or smaller value of the actually detected fuel pressure relative to the switching pressure. If the detected result of the fuel pressure is smaller than the switching pressure, the open control is executed since the fuel pressure is discriminated to be in the low-pressure condition in which the detection errors are large.

It is preferable to establish hysteresis in the aforementioned constitution that the low-pressure or high-pressure condition is discriminated by comparing the actually detected fuel pressure with the previously set switching pressure.

According to such a constitution, hunting in the switching control can be avoided, since the switching between the open and closed controls is not implemented even when pulsation has occurred in the detection value of the fuel pressure, if such pulsation is within a dead zone of the hysteresis characteristics. The hysteresis may be established for either of the increasing and decreasing directions of the fuel pressure, or for both of them.

The discrimination, as to which of the low-pressure condition and high-pressure condition the pressure of fuel to be fed to the fuel injection valve is in, may be effected by comparing at least one of the engine rotation speed and the rotation speed of the high-pressure fuel pump with a previously set switching rotation speed.

In such a constitution, since the high-pressure fuel pump is driven by the engine, the engine rotation speed indirectly indicates the rotation speed of the high-pressure fuel pump, so that the fuel pressure is assumed to have been sufficiently increased when the rotation speed of high-pressure fuel pump or engine has been sufficiently increased.

Further, the discrimination, as to which of the low-pressure condition and high-pressure condition the pressure of fuel to be fed to the fuel injection valve is in, may be implemented based on the comparison of the lapse time from engine starting with a previously set switching time.

In such a constitution, the fuel pressure increases corresponding to the lapse time from the engine starting, so that the low-pressure and high-pressure conditions can be discriminated by assuming the fuel pressure corresponding to the lapse time.

Further objects, advantages and details of the present invention will become more apparent from the following description of preferred embodiments when read in conjunction with the accompanying drawings.

DESCRIPTION OF THE PREFERRED EMBODIMENTS

The preferred embodiments will be described hereinafter.

Figure 1:
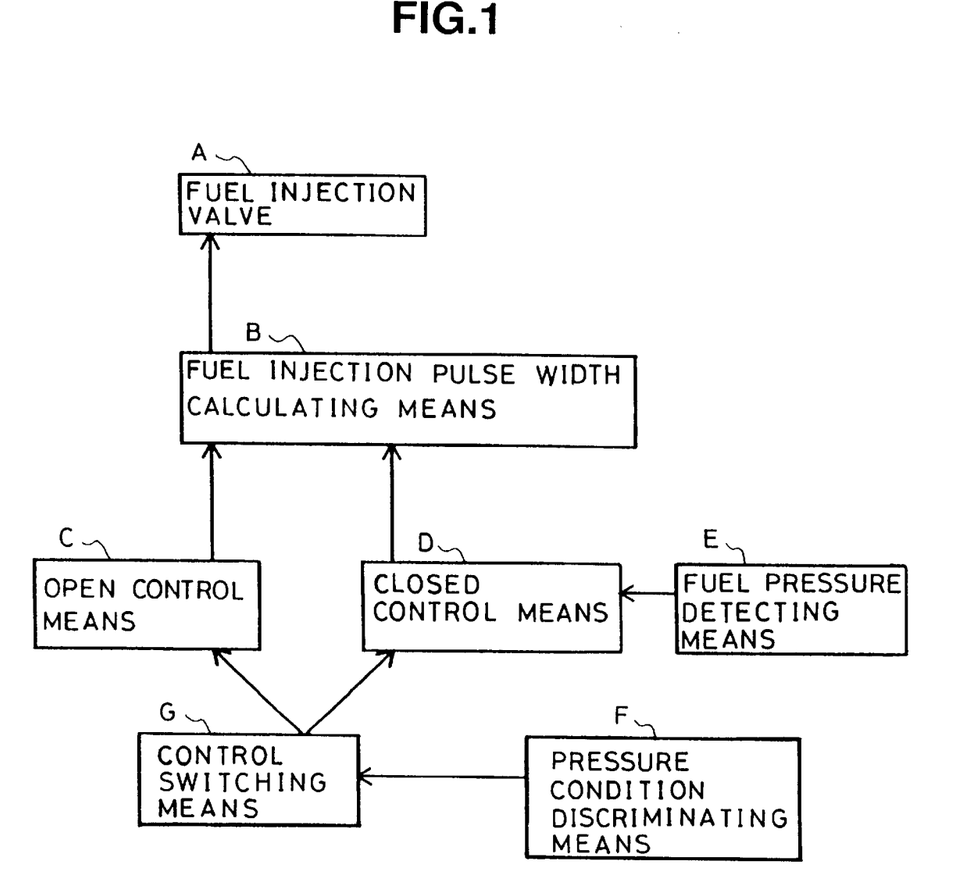
FIG. 1 is a block diagram of a basic constitution of an apparatus for controlling fuel injection according to the present invention.

In FIG. 1 which is a block diagram of a basic constitution of an apparatus for controlling fuel injection according to the present invention, reference character A designates a fuel injection valve for directly injecting fuel into a combustion chamber or cylinder, and B designates fuel injection pulse width calculation means for calculating pulse width of an injection pulse signal to be output to the fuel injection valve A (fuel injection pulse width) based on engine operating conditions such as intake air amount, engine rotation speed, and cooling water temperature. The fuel injection valve A is driven to open by the injection pulse signal to thereby inject fuel for the duration of the fuel injection pulse width.

Reference character C designates open control means for correcting the fuel injection pulse widths based on a predetermined reference pressure, assuming that a pressure of fuel fed to the fuel injection valve A equals to the predetermined reference pressure, while D designates closed control means for correcting the fuel injection pulse widths based on an actual pressure of fuel detected by fuel pressure detecting means E.

Further, pressure condition discriminating means F discriminates as to which of the low-pressure condition and high-pressure condition the pressure of fuel fed to the fuel injection valve A is in, i.e., whether the pressure condition in which detection errors in the fuel pressure detecting means E are sufficiently small is established or not.

Control switching means G activates the open control means C, when the fuel pressure is discriminated to be in the low-pressure condition, to thereby make the means C correct the injection pulse widths assuming that the fuel pressure is constant to be the predetermined reference pressure; and activates the closed control means D, when the fuel pressure is discriminated to be in the high-pressure condition, to thereby make the means D correct the injection pulse widths based on the actually detected fuel pressure.

There will be described hereinafter in detail the apparatus and method for controlling fuel injection having the aforementioned basic constitution according to the present invention.

Figure 2:
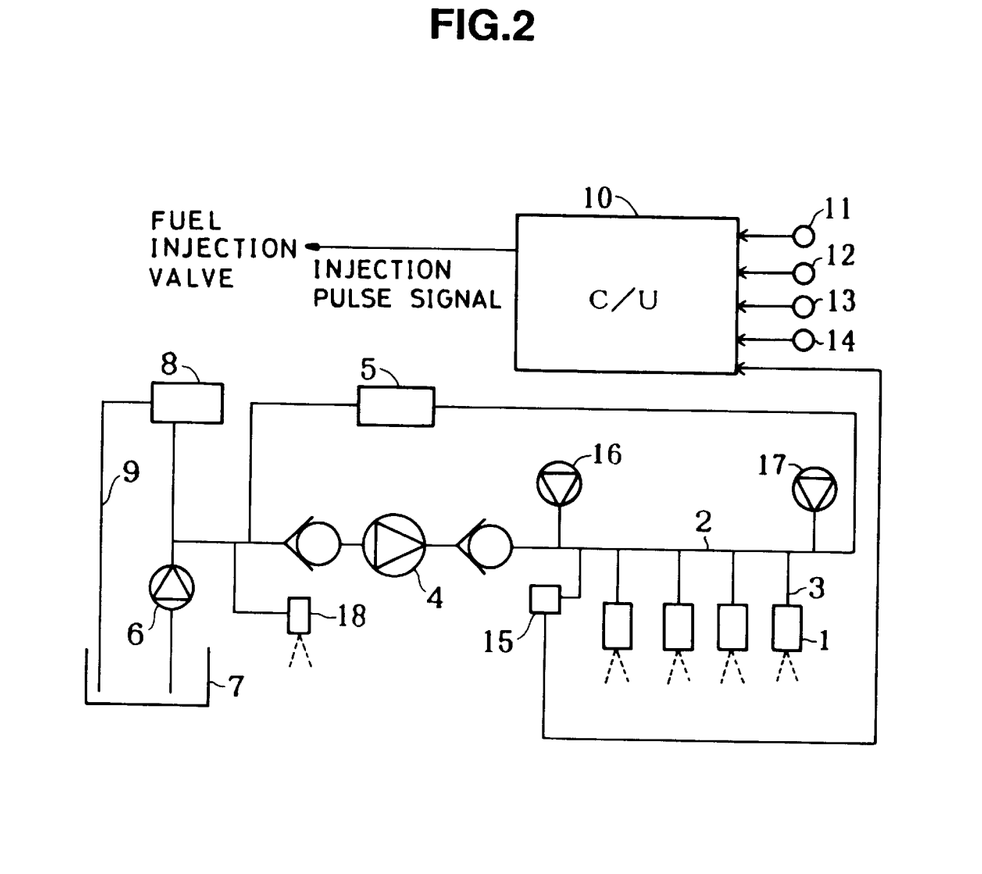
FIG. 2 is a constitutional diagram showing an apparatus for controlling fuel injection according to the embodiments of the present invention.

FIG. 2 is a constitutional diagram showing the apparatus for controlling fuel injection of a direct injection internal combustion engine, in the embodiments.

In FIG. 2, reference numeral 1 designate electromagnetic fuel injection valves (fuel injection valve A) each of which is arranged to face the combustion chamber of each of cylinders of the direct injection internal combustion engine to thereby directly inject fuel into the combustion chamber.

Fuel is distributed to each of the fuel injection valves 1, via a common rail 2 and distribution lines 3, while the common rail 2 is fed with pressurized fuel from an engine-driven high-pressure fuel pump 4.

Provided at the downstream side of the common rail 2 is a high-pressure pressure regulator 5 which regulates the fuel pressure within the high-pressure fuel system between the high-pressure fuel pump 4 and high-pressure pressure regulator 5 to a predetermined high pressure. When the actual pressure of fuel in the high-pressure fuel system is higher than the predetermined high pressure, this high-pressure pressure regulator 5 returns the fuel within the high-pressure fuel system to a suction side of the high-pressure fuel pump 4, to thereby regulate the actual pressure of fuel to the predetermined high pressure.

Fed to the high-pressure fuel pump 4 is fuel which is sucked from a fuel tank 7 by an electric low-pressure fuel pump 6 and thereafter regulated to a predetermined low pressure by a low-pressure pressure regulator 8.

When the pressure of fuel to be fed to the high-pressure fuel pump 4 is higher than the predetermined low pressure, the low-pressure pressure regulator 8 returns the fuel within the low-pressure fuel system between the low-pressure fuel pump 6 and the high-pressure fuel pump 4, to the fuel tank 7 via a return path 9, to thereby regulate the actual pressure of fuel to the predetermined low pressure.

A control unit 10 which outputs injection pulse signals to the fuel injection valve 1 at predetermined injection timings, incorporates a microcomputer and operates the various detection signals according to a program prepared in advance, to thereby obtain the pulse widths for the injection pulse signal (fuel injection pulse width).

Input to the control unit 10 are such as intake air amount signal Q from an airflow meter 11, engine rotation speed signal Ne from a crank angle sensor 12, cooling water temperature signal Tw from a water temperature sensor 13, ON/OFF signal from a start switch 14, and fuel pressure signal P from a fuel pressure sensor 15.

The fuel pressure sensor 15 which corresponds to the fuel pressure detecting means E, detects a pressure of fuel within the aforementioned high-pressure fuel system, i.e., a pressure of fuel to be fed to the fuel injection valve 1. Hereinafter, the term "fuel pressure" shall exclusively mean a pressure of fuel within the aforementioned high-pressure fuel system, i.e., a pressure of fuel to be fed to the fuel injection valve 1.

In FIG. 2, reference numerals 16, 17 designate accumulators, and 18 designates a cold start valve.

Figure 3:
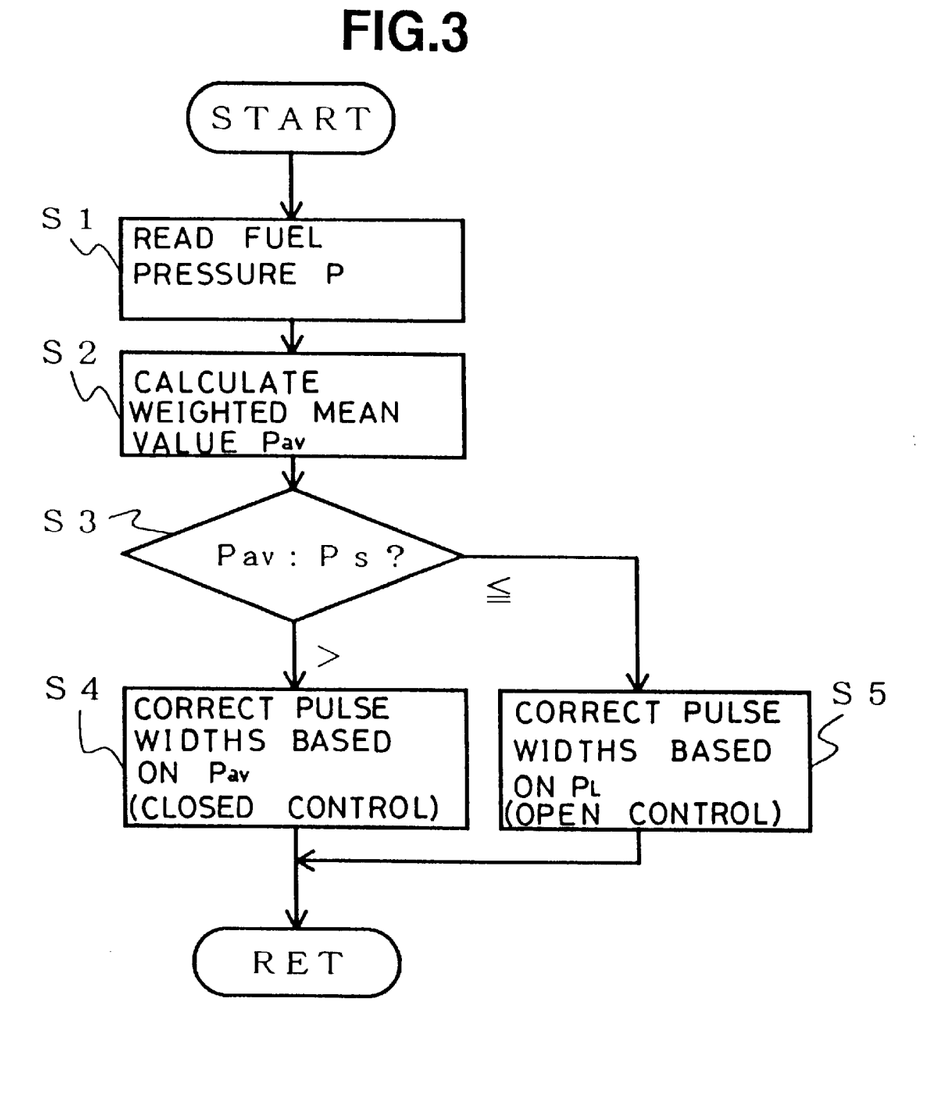
FIG. 3 is a flow chart describing an operation of a pulse width correction control in a first embodiment.

The control unit 10 calculates the fuel injection pulse widths suited for a normal fuel pressure condition, based on the intake air amount Q, engine rotation speed Ne, cooling water temperature Tw and the like (fuel injection pulse width calculation means B), and corrects the fuel injection pulse widths based on the detection result of the fuel pressure sensor 15, as shown in the flow chart of FIG. 3 describing an operation of such a correction control.

Referring to the flow chart of FIG. 3, the detection signal P from the fuel pressure sensor 15 is read in at step S1.

At the next step S2, the fuel pressures P detected by the fuel pressure sensor 15 are averaged in a weighted manner to obtain a weighted mean value Pav.

At step S3, by comparing the weighted average value Pav with a previously set switching pressure Ps, it is discriminated as to which of a low-pressure condition lower than the switching pressure Ps and a high-pressure condition higher than the switching pressure Ps the current fuel pressure condition is in (pressure condition discriminating means F).

Figure 6:
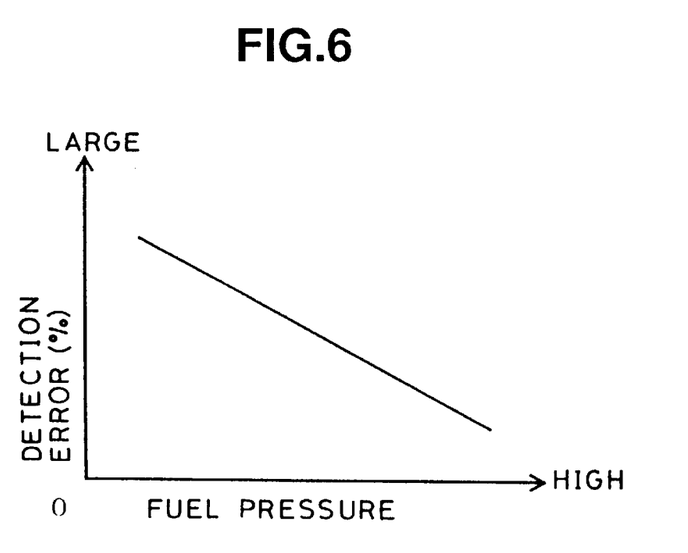
FIG. 6 is a diagram showing detection error characteristics of a fuel pressure sensor.
Figure 7:
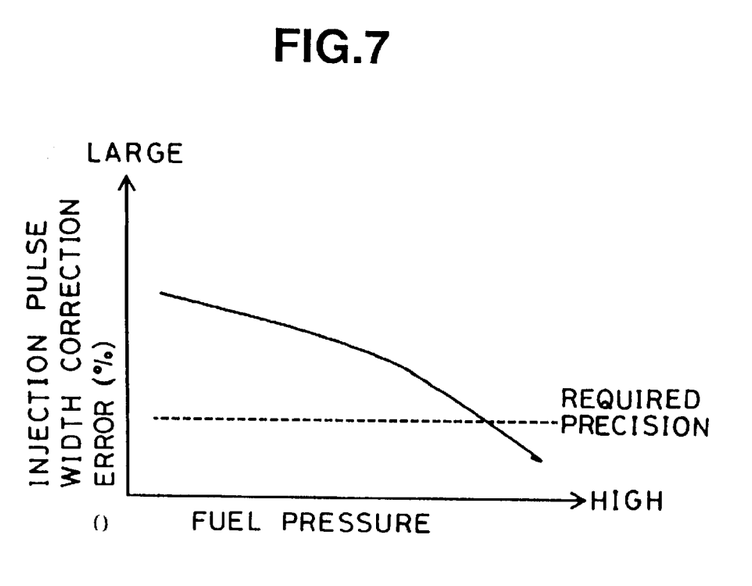
FIG. 7 is a diagram showing error characteristics of pulse width correction due to detection errors of the fuel pressure sensor.

The switching pressure Ps is a threshold pressure value, below which the detection error by the fuel pressure sensor 15 is equal to or above a predetermined value so that the required correction precision is not satisfied by the injection pulse widths obtained based on the detection result of fuel pressure (see FIGS. 6 and 7). That is, the fuel pressure sensor 15 has such characteristics in which the error rate becomes larger as the fuel pressure becomes lower as shown in FIG. 6, so that the correction error of injection pulse widths becomes larger in the low-pressure condition just after starting as shown in FIG. 7. Thus, it is discriminated as to whether this correction error is equal to or smaller than the required precision or not by comparing the current fuel pressure condition with the switching pressure Ps.

If it is judged at step S3 that the actual fuel pressure Pav is higher than the switching pressure Ps, the flow branches to step S4 to execute the closed control in which the fuel injection pulse widths are corrected based on the weighted mean value Pav and the aforementioned reference pressure (closed control means D).

In this case, the injection pulse widths are corrected based on the detection result of the actual fuel pressure, so that the intended quantity of fuel can be injected even when the fuel pressure varies.

If it is judged at step S3 that the actual fuel pressure Pav is equal to or lower than the switching pressure Ps so that the situation is a low-pressure condition just after starting, the flow branches to step S5.

At step S5, there is executed the open control for correcting the fuel injection pulse widths without adopting the weighted mean value Pav, while assuming that the fuel pressure is equal to a regulating pressure PL regulated by the low-pressure pressure regulator 8 (open control means C).

In the low-pressure state in which the actual fuel pressure Pav is equal to or lower than the switching pressure Ps, the detection errors of the fuel pressure sensor 15 are so large that the large correction errors are caused if the fuel injection pulse widths are corrected based on the actual detection result (see FIGS. 6 and 7), as noted above.

Thus, during the low-pressure state, the fuel injection pulse widths are corrected by assuming that the actual fuel pressure is equal to the regulating pressure PL regulated by the low-pressure pressure regulator 8, i.e., by representing the actual fuel pressure by the regulating pressure PL, according to the present invention. As a result, the correction errors can be assuredly restricted to a predictably relatively small level.

The processing which branches from step S3 to either of step S4 or S5 corresponds to the control switching means G.

Figure 8:
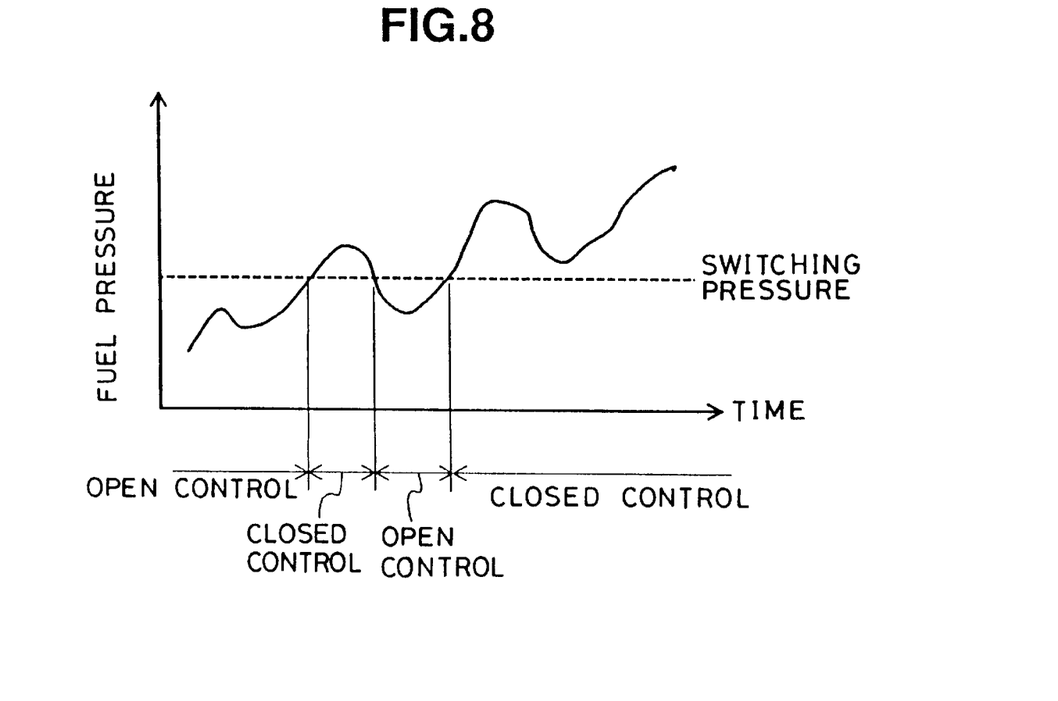
FIG. 8 is a time chart showing the correlation between a fuel pressure pulsation and a control state.
Figure 9:
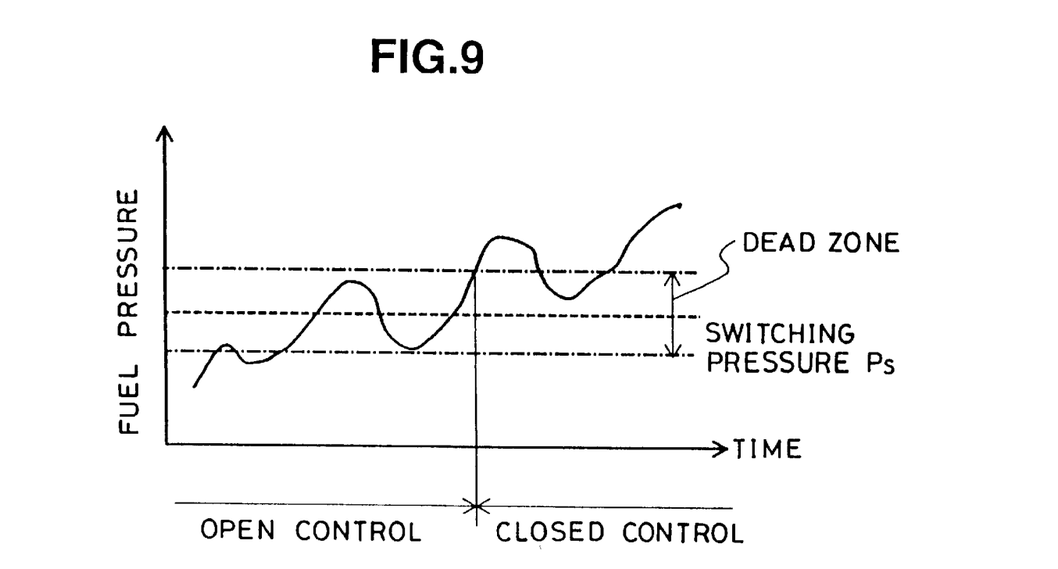
FIG. 9 is a time chart showing the characteristics when hysteresis is provided in the fuel pressure judgement.

Meanwhile, when the fuel pressure increases as shown in FIG. 8, if the fuel pressure pulsates so as to become larger and smaller than the constant switching pressure Ps, there will occur hunting in the discrimination between the low-pressure and high-pressure conditions, thus in the switching between the open and closed controls. It is therefore preferable to establish hysteresis in the discrimination between the low-pressure and high-pressure conditions (control switching) based on the switching pressure Ps, and to provide a dead zone for the discrimination, as shown in FIG. 9. Although the hysteresis is established for both of the decreasing and increasing directions of the fuel pressure in FIG. 9, either one direction will do.

Further, in the flow chart of FIG. 3, there is executed the discrimination between the low-pressure and high-pressure conditions for correspondingly switching between the closed and open controls, based on the detection result of the fuel pressure sensor 15. However, it is possible to discriminate between the low-pressure and high-pressure conditions, by assuming the actual fuel pressure based on the parameters correlated to the fuel pressure. Such a constitution is adopted in each of the embodiments shown in the flow charts of FIGS. 4 and 5.

Figure 4:
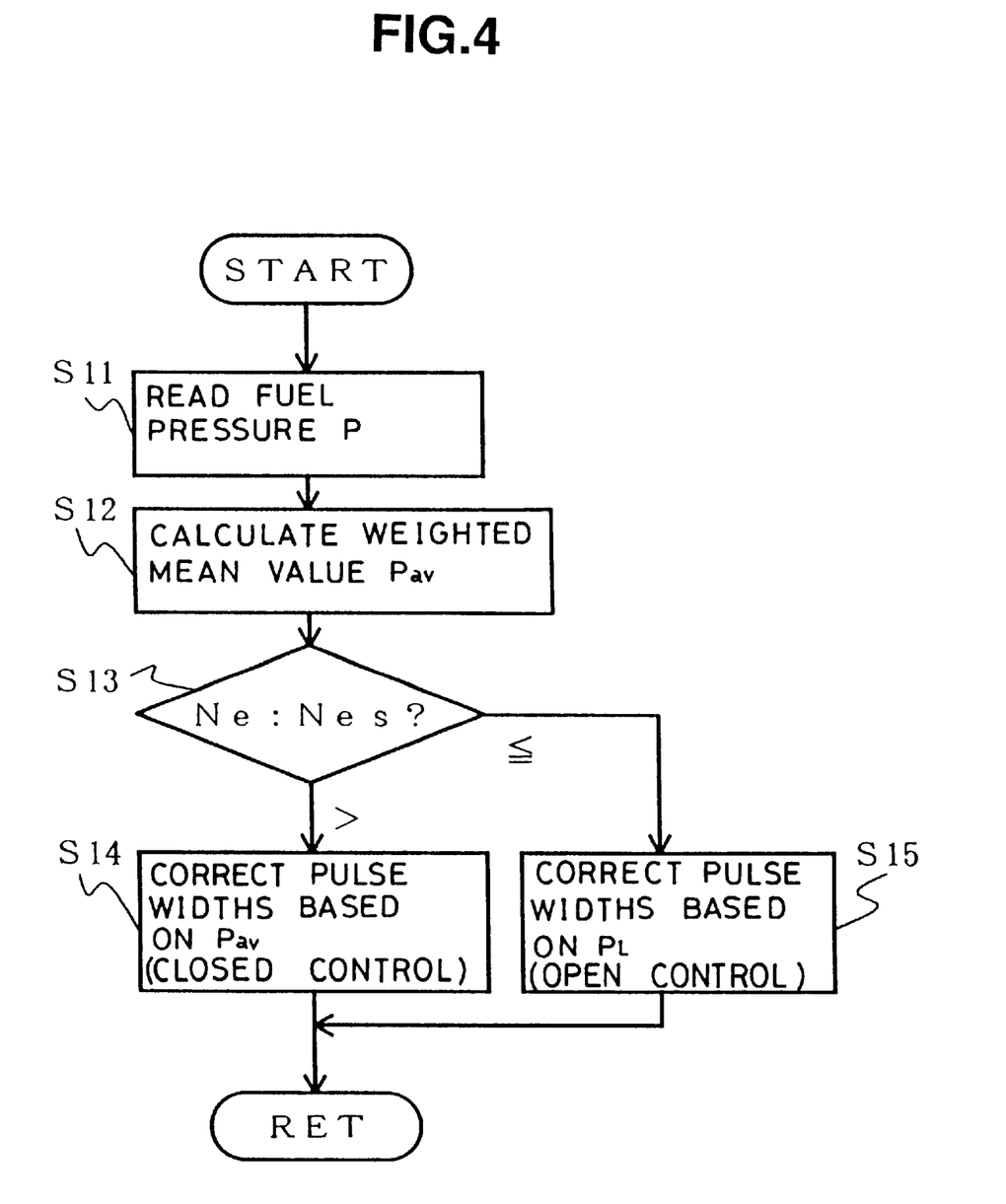
FIG. 4 is a flow chart describing an operation of a pulse width correction control in a second embodiment.

Referring to FIG. 4, in each of those steps (S11, S12, S14, S15) except for step S13 as the pressure condition discriminating means F, there are executed the processings exactly same with steps S1, S2, S4 and S5 of the flow chart of FIG. 3. Thus, only step S13 (corresponding to step S3 in FIG. 3) will be described in detail hereinafter.

At step S13 in the flow chart of FIG. 4, the engine rotation speed Ne is compared with a previously set switching speed Nes. If the engine rotation speed Ne is higher than the switching speed Nes, the current fuel pressure condition is discriminated to be in the high-pressure condition, so that the flow branches to step S14 in which the correction control of injection pulse widths is executed based on the detection result of the fuel pressure sensor 15 (closed control).

If the engine rotation speed Ne is judged to be equal to or lower than the switching speed Nes at step S13, the current fuel pressure condition is discriminated to be in the low-pressure condition, so that the flow branches to step S15 in which the correction control of injection pulse widths is executed by assuming that the fuel pressure is equal to the regulating pressure PL regulated by the low-pressure pressure regulator 8, without adopting the detection result of the fuel pressure sensor 15 (open control).

Since the high-pressure fuel pump 4 is driven by engine, this fuel pump is driven at a constant rotational speed correlative to the engine rotation speed Ne. This means that the fuel pressure is in the high-pressure condition after starting, if the engine rotation speed Ne has been sufficiently increased so that the rotational speed of the high-pressure fuel pump 4 is increased sufficiently. Thus, it is possible to discriminate between the low-pressure and high-pressure conditions by comparing the detected engine rotation speed Ne with the previously set switching speed Nes, as described above.

It is possible to discriminate between the low-pressure and high-pressure conditions by directly detecting the rotational speed of the high-pressure fuel pump 4, instead of the engine rotation speed Ne.

Further, the fuel pressure increases gradually, corresponding to the lapse time from the starting of engine, i.e., from the starting of activation of the high-pressure fuel pump 4. Thus, it is also possible to assume the fuel pressure based on the lapse time from the engine starting, so that the low-pressure condition in which the open control is to be executed and the high-pressure condition in which the closed control is to be executed are discriminated based on the lapse time from the engine starting.

Figure 5:
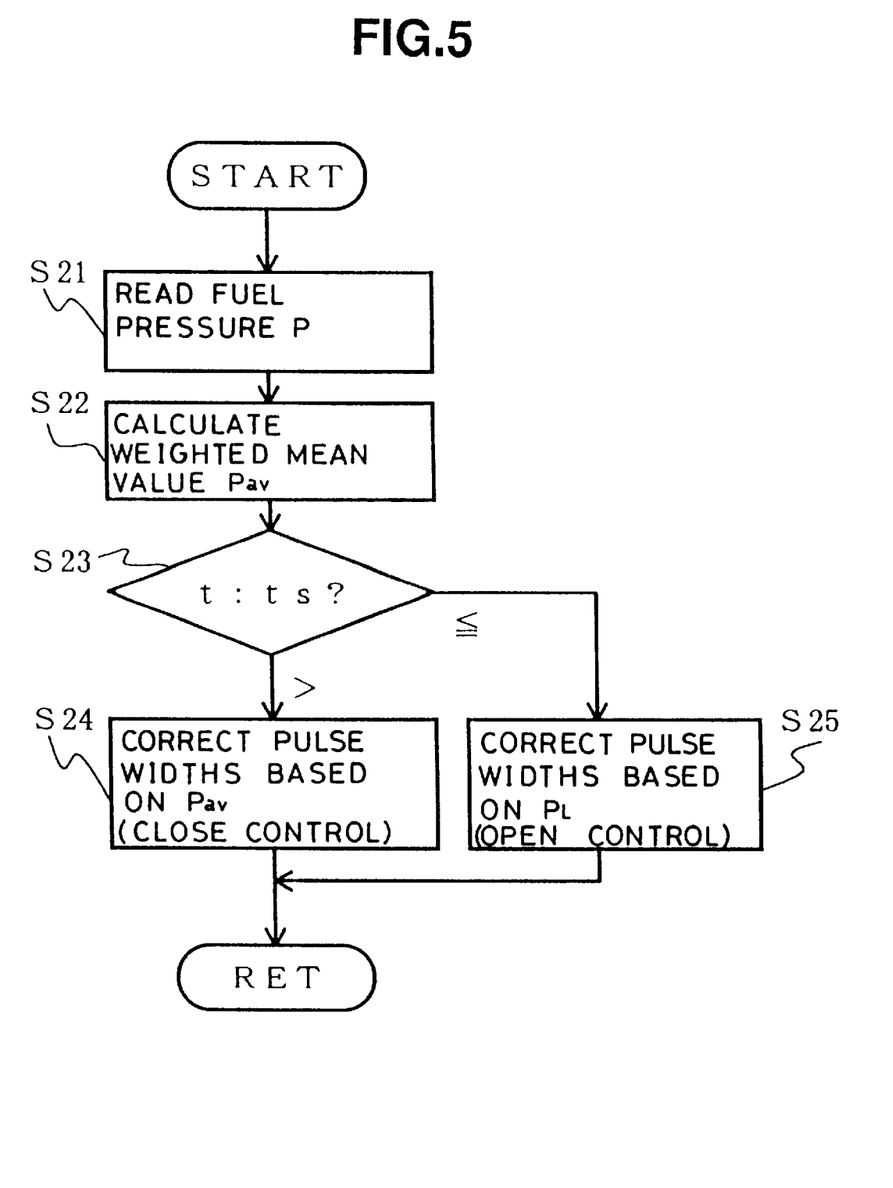
FIG. 5 is a flow chart describing another operation of a pulse width correction control in the second embodiment.

The flow chart of FIG. 5 describes an embodiment adopting such a constitution that the low-pressure and high-pressure conditions are discriminated based on the lapse time from the engine starting to thereby switch between the open and closed controls, as noted above. Similarly to the flow chart of FIG. 4, only the step S23 in which the discrimination between the low-pressure and high-pressure conditions is executed (pressure condition discriminating means F) differs from the flow chart of FIG. 3.

At step S23 of the flow chart of FIG. 5, the lapse time t from engine starting is compared with a previously set switching time ts. If the lapse time t has not yet reached the switching time ts, the pressure condition is judged to be the low-pressure condition and the flow branches to step S25 at which the open control is executed. If the lapse time t from engine starting has exceeded the switching time ts, the pressure condition is judged to be the high-pressure condition and the flow branches to step S24 at which the closed control is executed.

What is claimed is:

1. An apparatus for controlling injection of a direct injection internal combustion engine, comprising:
    a fuel injection valve that directly injects fuel into a combustion chamber of the engine;
    a fuel injection pulse width calculating unit that calculates pulse widths of an injection pulse signal to be output to said fuel injection valve, based on engine operating conditions;
    an open control unit that corrects the pulse widths of the injection pulse signal calculated by said fuel injection pulse width calculating unit, by assuming that a pressure of fuel to be fed to said fuel injection valve equals a predetermined reference pressure;
    a fuel pressure detecting sensor that detects a pressure of fuel to be fed to said fuel injection valve;
    a closed control unit that corrects the pulse widths of the injection pulse signal calculated by said fuel injection pulse width calculating unit, based on the fuel pressure detected by said fuel pressure detecting sensor;
    a pressure condition discriminating unit that discriminates as to which of a low-pressure condition and a high-pressure condition the pressure of fuel to be fed to said fuel injection valve is in; and
    a control switching unit that activates said open control unit and said closed control unit when the fuel pressure is discriminated, by said pressure condition discriminating unit, to be in the low-pressure condition and in the high-pressure condition, respectively.

2. An apparatus for controlling injection of a direct injection internal combustion engine, comprising:
    a fuel injection valve for directly injecting fuel into a combustion chamber of the engine;
    fuel injection pulse width calculating means for calculating pulse widths of an injection pulse signal to be output to said fuel injection valve, based on engine operating conditions;
    open control means for correcting the pulse widths of the injection pulse signal calculated by said fuel injection pulse width calculating means, by assuming that a pressure of fuel to be fed to said fuel injection valve equals a predetermined reference pressure;
    fuel pressure detecting means for detecting a pressure of fuel to be fed to said fuel injection valve;
    closed control means for correcting the pulse widths of the injection pulse signal calculated by said fuel injection pulse width calculating means, based on the fuel pressure detected by said fuel pressure detecting means;
    pressure condition discriminating means for discriminating as to which of a low-pressure condition and a high-pressure condition the pressure of fuel to be fed to said fuel injection valve is in; and
    control switching means for activating said open control means and said closed control means when the fuel pressure is discriminated, by said pressure condition discriminating means, to be in the low-pressure condition and in the high-pressure condition, respectively.

3. An apparatus for controlling fuel injection of a direct injection internal combustion engine according to claim 1, further comprising:
    an engine-driven high-pressure fuel pump for feeding fuel to said fuel injection valve,
    an electric low-pressure fuel pump for feeding fuel to said high-pressure pump,
    a low-pressure pressure regulator for regulating a pressure within a low pressure fuel system between said low-pressure fuel pump and said high-pressure fuel pump to a predetermined low pressure, and
    a high-pressure pressure regulator for regulating a pressure within a high pressure fuel system on a downstream side of said high-pressure fuel pump to a predetermined high pressure,
    wherein said open control means corrects the fuel injection pulse widths by adopting the regulated pressure to be attained by said low-pressure pressure regulator as said predetermined reference pressure.

4. An apparatus for controlling fuel injection of a direct injection internal combustion engine according to claim 3,
    wherein said pressure condition discriminating means discriminates between the low-pressure and high-pressure conditions, by comparing at least one of the engine rotation speed and the rotation speed of said high-pressure fuel pump with a previously set switching rotation speed.

5. An apparatus for controlling fuel injection of a direct injection internal combustion engine according to claim 1,
    wherein said pressure condition discriminating means discriminates between the low-pressure and high-pressure conditions, by comparing the fuel pressure detected by said fuel pressure detecting means with a previously set switching pressure.

6. An apparatus for controlling fuel injection of a direct injection internal combustion engine according to claim 5, wherein said pressure condition discriminating means discriminates between the low-pressure and high-pressure conditions, with hysteresis.

7. An apparatus for controlling fuel injection of a direct injection internal combustion engine according to claim 1, wherein said pressure condition discriminating means discriminates between the low-pressure and high-pressure conditions, by comparing a lapse time from engine starting with a previously set switching time.

8. A method for controlling fuel injection of a direct injection internal combustion engine, comprising the steps of:

calculating, based on engine operating conditions, pulse widths of an injection pulse signal to be output to a fuel injection valve which directly injects fuel into a combustion chamber of the engine;

discriminating as to which of low-pressure and high-pressure conditions a pressure of fuel to be fed to said fuel injection valve is in; and correcting said pulse widths, when the fuel pressure is discriminated to be in said low-pressure condition, by assuming that the pressure of fuel to be fed to said fuel injection valve is at a predetermined reference pressure, and when the fuel pressure is discriminated to be in the high-pressure condition, based on a detection result of the pressure of fuel fed to said fuel injection valve.

9. A method for controlling fuel injection of a direct injection internal combustion engine according to claim 8, wherein an engine-driven high-pressure fuel pump for feeding fuel to said fuel injection valve, an electric low-pressure fuel pump for feeding fuel to said high-pressure pump, a low-pressure pressure regulator for regulating a pressure within a low pressure fuel system between said low-pressure fuel pump and said high-pressure fuel pump to a predetermined low pressure, and a high-pressure pressure regulator for regulating a pressure within a high pressure fuel system on a downstream side of said high-pressure fuel pump to a predetermined high pressure, are provided, and wherein said pulse widths are corrected by adopting the regulating pressure to be attained by said low-pressure pressure regulator as said predetermined reference pressure, when the fuel pressure is discriminated to be in said low-pressure condition.

10. A method for controlling fuel injection of a direct injection internal combustion engine according to claim 9, wherein the fuel pressure is discriminated to be in said low-pressure condition or said high-pressure condition, by comparing at least one of the engine rotation speed and the rotation speed of said high-pressure fuel pump with a previously set switching rotation speed.

11. A method for controlling fuel injection of a direct injection internal combustion engine according to claim 8, wherein the fuel pressure is discriminated to be in said low-pressure condition or said high-pressure condition, by comparing a detection result of the fuel pressure fed to said fuel injection valve with a previously set switching pressure.

12. A method for controlling fuel injection of a direct injection internal combustion engine according to claim 11, wherein said discrimination between said low-pressure and high-pressure conditions, by comparing the detection result of the fuel pressure fed to said fuel injection valve with said previously set switching pressure, is effected with hysteresis.

13. A method for controlling fuel injection of a direct injection internal combustion engine according to claim 8, wherein the fuel pressure is discriminated to be in said low-pressure condition or said high-pressure condition, by comparing a lapse time from engine starting with a previously set switching time.

* * * * *